Jan. 26, 1937. V. MULHOLLAND 2,068,925
GLASS MAKING APPARATUS AND METHOD
Filed June 13, 1934 3 Sheets-Sheet 1

Inventor:
Vergil Mulholland
by Brown & Carlaw
Attorneys

Witness:
W. B. Thayer.

Jan. 26, 1937.　　　V. MULHOLLAND　　　2,068,925
GLASS MAKING APPARATUS AND METHOD
Filed June 13, 1934　　3 Sheets-Sheet 2
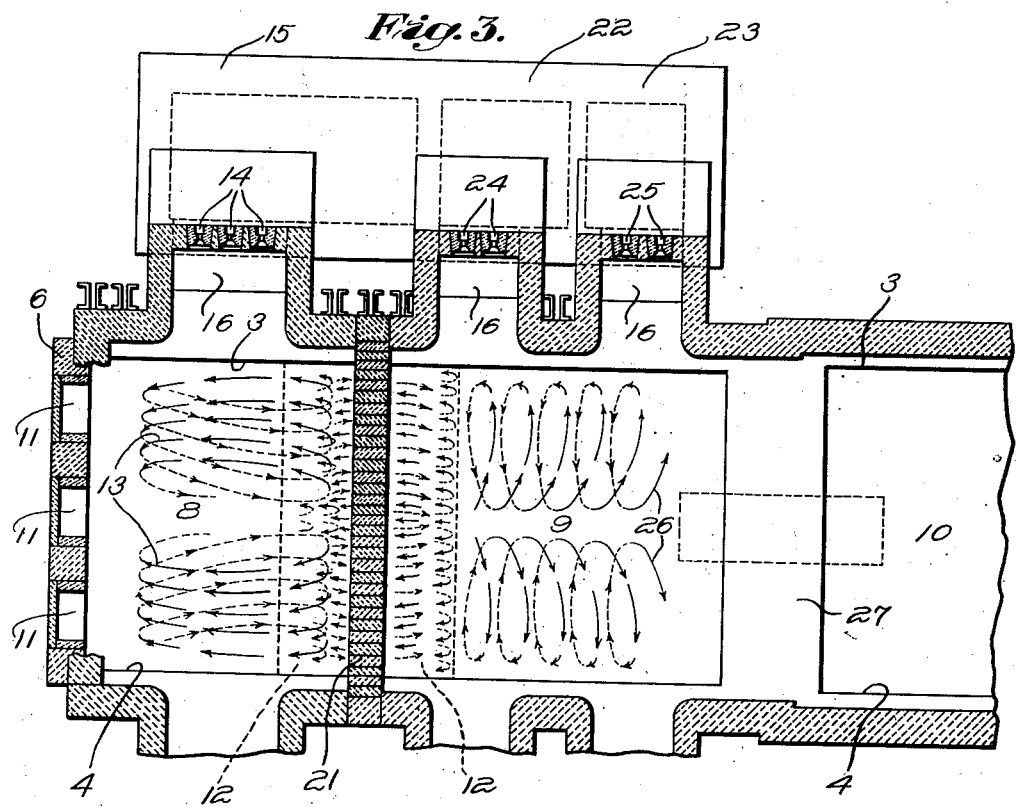
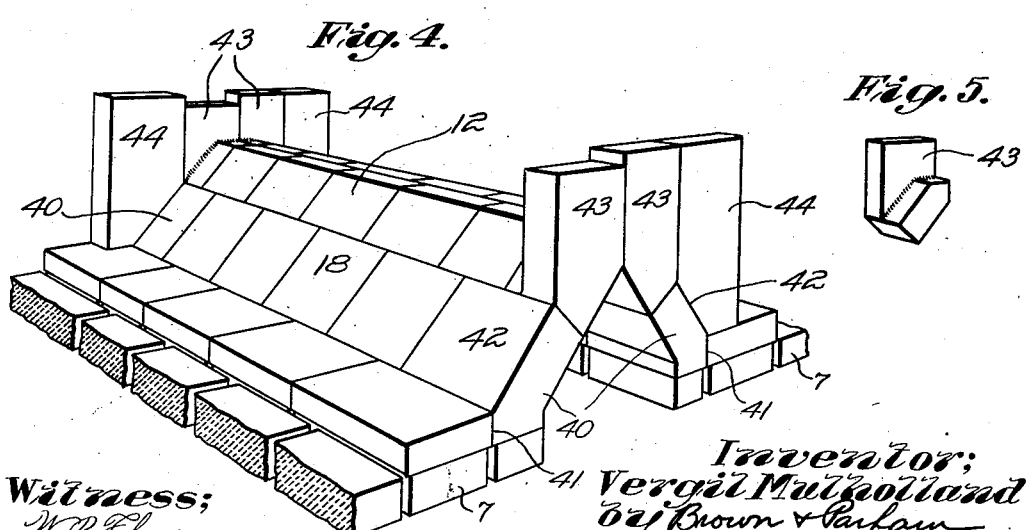

Jan. 26, 1937.  V. MULHOLLAND  2,068,925
GLASS MAKING APPARATUS AND METHOD
Filed June 13, 1934  3 Sheets-Sheet 3

Witness;
W. B. Thayer

Inventor;
Vergil Mulholland
by Brown + Parham
Attorneys

Patented Jan. 26, 1937

2,068,925

UNITED STATES PATENT OFFICE 2,068,925

GLASS MAKING APPARATUS AND METHOD

Vergil Mulholland, West Hartford, Conn., assignor to Hartford-Empire Company, Hartford, Conn., a corporation of Delaware Application June 13, 1934, Serial No. 730,441

17 Claims. (Cl. 49—54)

This invention relates to a novel method of and apparatus for making glass in tank furnaces.

The general purpose of the present invention is to provide a glass melting tank and a method of glass making which will permit the making of clear homogeneous glass at high tank ratings, with a minimum fuel expenditure and with a certainty of continuous controlled operation at the varying rates of pull demanded by varying conditions of glassware manufacture.

There are four essential stages in the process of glass making which may be defined as follows:

(1) The actual melting or complete fusion of the batch and bringing of the temperature of the fused mass up to a required point (usually about 2650° F.). This stage is practically complete when no trace of sand crystals can be found in the melt.

(2) The thorough intermingling or homogenizing of the fused mass, so that the various silicates formed are merged into a complete solution. The completeness of this stage is judged by the uniformity of density and refractive index.

(3) The refining, clearing or elimination of gas and vapor bubbles from the glass so that it is free from seeds and blisters.

(4) The reduction to suitable working end temperature (usually about 2350° F.) with prevention of either stagnation or channelling in this working end.

In the making of glass in continuous tanks, all these steps or stages are proceeding simultaneously and the problem is to provide the conditions of temperature and time essential for each stage and still prevent each succeeding stage from being contaminated or delayed by the one preceding it.

The problem has heretofore been solved by the use of relatively large tank dimensions and low rates of production, as in the usual flat glass tank, but this is done only at the expense of very high operating costs.

In the smaller tanks, such as have commonly been used in the bottle or container art, it has heretofore proven impossible to attain an adequate practical separation of these stages, particularly when these tanks are operated at high and/or varying rates of production. When sufficient separation of the stages has been accomplished in bottle tanks, it has been also at the expense of production and hence of economy.

The inefficiency of the prior art tanks has resided chiefly in the lack of adequate separation and control of melting and refining.

The rate at which melting or fusion occurs is chiefly dependent upon how fast heat can be driven into and be absorbed by the batch or glass making materials. Homogenizing also is best accomplished when there is a relatively high temperature and low viscosity together with an adequate stirring of the glass, as by active convection movements from the thermal circulation of the glass. This may take place partially during the melting but should be completed in a circulation which is not continuously contaminated by unmelted or partially melted batch. In a practical operation of a continuous tank, the clearing or refining may be accomplished at a slightly lower temperature than that employed for melting, though high temperature is desirable, in order that the glass viscosity be low enough to allow gas bubbles to rise rapidly. An active circulation of the glass, as by convection currents, should also be present during refining or clearing, but these currents should preferably be so controlled as to prevent a circulation of glass in the clearing zone which would tend to return the refining glass to the melting circulation or any other currents that might tend to establish short circuit routes from the melting zone to the working end of the tank.

In the commercial production of glass in this country, the melting of glass making materials, the homogenizing and the refining of the glass produced from such fusion, is carried on in a single chamber and usually with a single firing system, and it is only after the stages of melting, homogenizing and refining have been carried out as completely as the furnace will permit that the glass is passed to a separated chamber for tempering and for distribution to feeders or other means for dividing up the glass in the production of ware.

In such furnaces, the standard of performance is relatively low for the reason that the application of heat is necessarily a compromise between that best suited for melting and homogenizing and refining, as heretofore stated.

In furnaces in which melting and refining are carried on in a single chamber, attempts to run at maximum melting capacity tend to loss of control of the circulations and an objectionable contamination of the refining glass by glass which has not yet been sufficiently melted. This contamination of the glass in the refining portion of the container requires an undue expenditure of heat and time in the refining process.

Also, in the prior art furnaces, variations in the "pull" upset the balance of conditions within the tank. The lack of adequate separation of the control of the operations of melting and refining often makes it quite difficult to establish proper conditions for the different rates of pull, and as a result, bad glass is produced.

Even apart from these variations, however, the necessity of carrying on several operations in a single chamber and by the use of a single source of heat has an inherent tendency to reduce the efficiency of the glass making operation and prevents the furnace from being "rated up", i. e., making a maximum quantity of good glass per unit of area under fire per unit of time.

The present invention provides means and a method by which the stages of melting and refining may be continuously performed and varied independently of each other, so that each stage may be performed under conditions most favorable to that stage and so that there may be a minimum overlapping, short-circuiting or contamination of one stage of operation by the other.

This is accomplished by the creation in separate zones of distinct and separately controllable circulations for melting and refining. In the first circulation, melted glass and partially melted glass are caused to circulate primarily by the application of heat from one source and in the other the glass is circulated in a zone removed from the first mentioned zone by the application of heat principally from a different and separately controlled source.

My invention further provides a method in which the rate of passage of melted glass into the refining circulation may be substantially equal to the rate of withdrawal of the finished glass from the furnace, there being substantially no return of refining glass from the refining circulation to the melting circulation.

My invention also provides a method as set forth above, in which the first circulation is in a path, the general direction of which is longitudinal of the furnace, while the second circulation lies principally at a substantial angle to the general direction of the first circulation.

A more specific object of my invention is to effect the separation of the two circulations above mentioned in part by mechanical means, as for example by the provision of a weir.

A still further object of my invention is to provide a method above set forth, characterized by such supply of batch and such an application of heat to the glass and batch in the melting zone as to create a zone of highest heat in the glass over and adjacent to a weir partially separating the melting zone from the refining zone, and by so doing to effect substantially a single thermal circulation within the melting zone in which the glass moves on the surface from the hot zone toward the rear (charging end) of the furnace and returns at a lower level to the hot zone, such glass as moves out of such circulation being caused to move principally by withdrawals from the forward portions of the tank and at substantially the rate of such withdrawals.

A further object of my invention is to provide a new and improved furnace structure adapted particularly to the practice of the method above set forth and comprising some or all of the following features: (1) the provision of the side walls of high heat conductivity in the refining zone; (2) the provision of a suitable weir partially separating the glass containing portions of the melting and refining zones; (3) the provision of a suitable fire wall at least partially separating the combustion spaces over the melting and refining zones; and (4) the provision of distinct and separately controlled firing systems for the melting zone and the refining zone respectively.

Further objects and advantages of my invention will be apparent from a reading of the following specification and appended claims when taken in connection with the accompanying drawings, in which—

Fig. 3 is a view substantially in horizontal section of a portion of the furnace of Figs. 1 and 2, taken substantially on the line 3—3 of Fig. 2;

Figs. 4 and 5 show details of a preferred form of weir construction designed for use in a furnace, such as shown in Figs. 1 to 3 inclusive;

Figure 2:
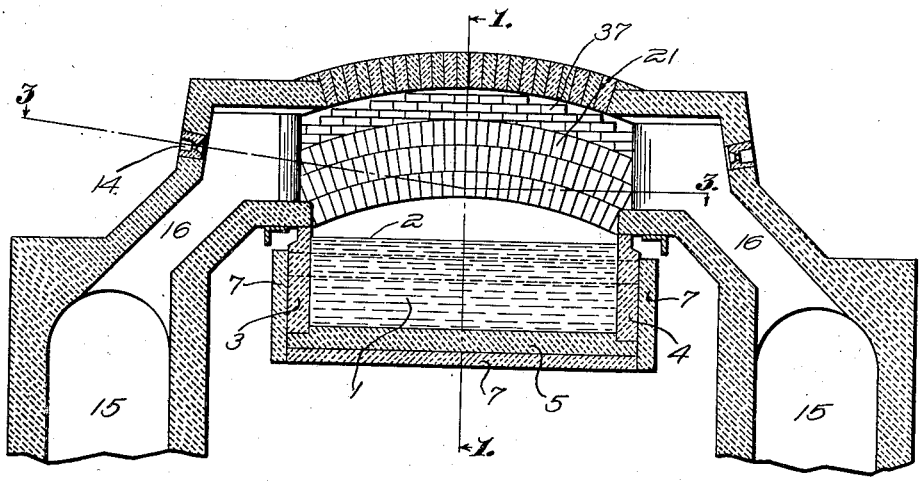
Fig. 2 is a transverse section with parts omitted of the structure of Fig. 1, on the line 2—2 in that figure.

Referring to the drawings and particularly to Figs. 1 to 3, 6 and 7 thereof, in which I have shown a preferred form of my invention, there is shown various views of a regenerative type continuous tank for melting glass. This tank is shown as containing a bath 1 of molten glass which is normally maintained up to a predetermined normal level 2 in the tank. The container for the bath includes side walls 3 and 4, a bottom generally indicated at 5, and an end wall 6 at the end of the tank at which the glass making materials are supplied. The opposite end of the tank is not illustrated in the accompanying drawings but may be assumed to be conventional. The walls and bottom of the container or glass containing basin of the tank may be supported in any usual and desired manner, for example, as shown and described in my copending application Serial No. 645,347, filed December 2, 1932.

The tank may be considered as divided into three zones, including a melting zone 8, a refining zone 9, and a tempering zone 10, provision being made, as will be hereinafter set forth, for the flow of glass between these zones.

Glass making materials or batch are supplied to the melting end of the tank, as indicated at 11, by any suitable means. The batch feeding ports 11 are arranged symmetrically across the charging end of the tank in such manner that the glass making materials or batch may be substantially uniformly distributed across such end. It is contemplated in this connection that any suitable type of means may be provided, preferably automatic in character and substantially continuous in operation, for supplying glass making materials or batch to the tank, as indicated at 19, the characteristic of these means which is particularly desired being that the distribution of the glass making materials or batch be substantially uniform across the entire melting end and the batch thus supplied in a relatively thin layer on the surface of the bath.

The glass in the melting zone 8 of the tank is partially separated from that in other portions of the tank by a weir 12 which may be formed, as shown, of one or more blocks built up from and/or forming a part of the bottom of the tank and supported in any desired manner, so as to preclude flow of glass from the melting zone 8 to the refining zone 9 except in an upper stratum of the bath. The weir 12 extends uniformly from side to side of the tank.

Though my invention is not limited to the use of particular refractories, I prefer to form the glass contacting walls and bottom, including the weir hereinafter described, of high grade refractories, such as the electrocast blocks known as "Corhart" which are highly resistant to wear under the conditions which I desire to maintain in the tank.

Figure 6:
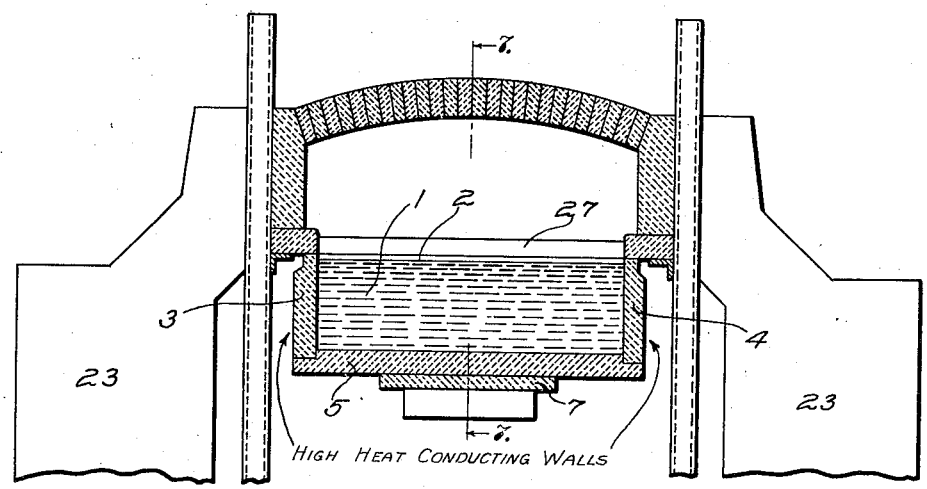
Fig. 6 is a view in vertical section on the line 6—6 of Fig. 7, illustrating particularly the wall construction of the refining chamber of the tank.

I preferably provide insulation 7 for the bottom of the melting and refining zones and for the side walls in the melting zone, while I prefer not to insulate the side walls in the refining zone as shown best in Fig. 6. These provisions are made to aid in the control of the direction and activity of the convection circulations in the two chambers, as it is desired to decrease as much as possible the activity of convection currents in the melting zone laterally of that tank, while in the refining zone it is desired to increase the activity of currents from the hotter center of the bath toward and down the cooler side walls while minimizing the longitudinal convection circulation in the refining zone.

The circulation (indicated at 13) in the melting end of the tank is maintained by a proper application of heat and by the provision of side walls of relatively low conductivity, as set forth. In the furnace illustrated, this heat is supplied from burners (not shown) associated with burner ports 14. These burners are preferably of the fluid fuel type (using either gas or oil as may be desired), and are adapted to direct fuel substantially transversely of the tank and, preferably as illustrated, at a slight angle downward with respect to the horizontal.

I provide regenerators 15 which may be supplied with any suitable type of checker brick in the well known manner, and which communicate with the tank through inclined passages 16, so that the highly heated air from the regenerators meets the incoming streams of fuel at a substantial angle and at a zone remote from the burners. However, if desired, the fuel and air may meet and initially mix prior to their passage across the glass containing basin of the tank.

Figure 1:
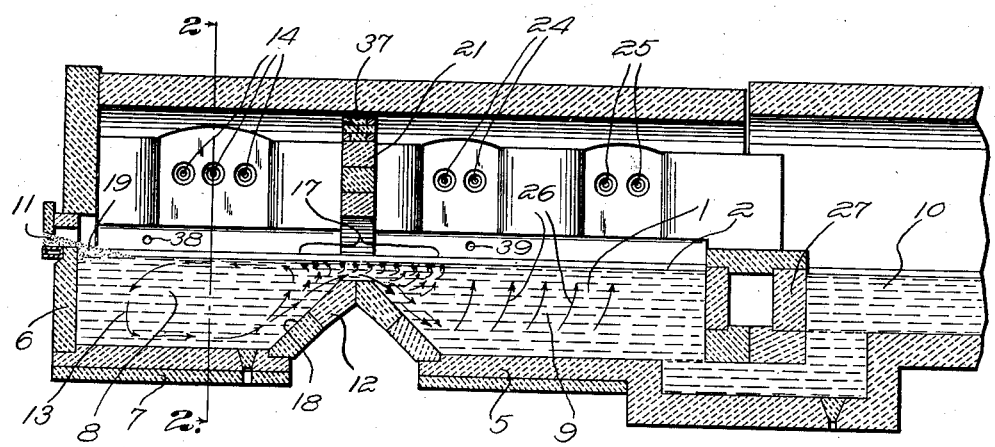
Figure 1 is a view substantially in central longitudinal vertical section of a tank furnace embodying my invention, the delivery end of the furnace being broken off and certain other details being omitted, both for convenience of illustration.

The zone of highest temperature in the glass bath is indicated at 17 and is preferably maintained as uniformly as possible all across the tank, so that glass will rise as illustrated by the arrows 13 substantially along the inclined glass-contacting surface 18 of the weir 12 and at a zone well spaced from the end of the melting compartment to which glass making materials are supplied. The glass will thence flow in an upper stratum of the bath toward the left hand end (rear) of the tank, as seen in Fig. 1, and thereby will serve to prevent portions of the unmelted glass making materials, indicated at 19, from floating out away from the batch feeding end of the tank. This maintains the glass making materials in a localized area, and positively prevents such materials from being prematurely carried into the refining zone or being carried by a "short circuit" to the working end of the tank. The glass then flows downwardly adjacent the end wall 6 (which is preferably uninsulated to augment this circulation) incorporating the newly fused material along with the circulating glass, and then flows forwardly in the lower stratum of the bath toward the weir.

This circulation may be considered as substantially about an axis extending transversely of the tank. The circulation is substantially orbital in character and it is far greater in degree than the actual movement of the glass through the tank necessitated by the pull thereon due to the withdrawal of finished glass from the tank.

There is preferably provided a shadow or fire wall 21 extending transversely of the tank above the normal glass level 2 therein for at least partially separating the flame space above the melting zone 8 from that above the refining zone 9 of the tank. As illustrated, this wall is formed of refractory material in the form of an arch above which may be constructed or laid other blocks 37 of refractory material arranged to obstruct, to the desired extent, the transference of heat between the flame spaces on opposite sides of the wall. By the use of this wall in conjunction with the weir previously described, I am enabled to provide substantial separation both above and below the glass line 2 and thus provide for the substantially independent control of the glass making operations taking place in these two zones.

The refining zone 9 of the tank is provided with suitable heat supplying means which may in general be similar to those above described for the melting end of the tank and which, as shown, comprise pairs of independently controllable regenerator sections 22 and 23, these sections being independent each of the other and of the regenerators 15 used in conjunction with the melting end of the tank. These regenerator sections cooperate respectively with suitable burners (not shown) which are associated with sets of burner openings 24 and 25 respectively. The general arrangement of the burners and their relation to the passages for the incoming and outgoing gases from and to the regenerators 22 and 23 are similar to that above described for the melting end of a tank and hence will not be here repeated.

While I contemplate that my method includes the use of different types of secondary or refining circulations and while the apparatus herein shown may be operated to create various types of circulations, I have illustrated in the accompanying drawings by the arrows 26 a preferred type of such circulations, those illustrated being such that the glass in the refining zone or compartment moves upwardly of the bath adjacent to the longitudinal center line of the tank, thence moves laterally toward each of the side walls 3 and 4 in an upper stratum of the bath, thence downwardly of these side walls, and thence toward the longitudinal center line again in a lower stratum of the bath. The pull on the furnace together with these convection currents gives to this circulation a two-fold or duplex circulation of substantially helical character about two parallel longitudinally extending axes. This particular type of circulation may be attained by maintaining the higher temperature in the refining zone adjacent to the longitudinal center line of the tank so as, in that zone, to cause the upward movement of the glass along the longitudinal center line as aforesaid, this circulation being augmented by the cooling effect of the side walls 3 and 4 causing the downward movement of the glass adjacent to such side walls. The side walls 3 and 4 of the refining chamber are so constructed and arranged as to have a relatively high heat conductivity. This may be accomplished in several ways, for example, the walls may be uninsulated as shown, Fig. 6; the walls may be of material of inherently high heat conductivity as "Corhart", mentioned above; the walls may be relatively thin, so that the high heat conductivity is a result of this thin section; or they may be externally cooled in any desired manner. I contemplate that any one or combination of two or more of these and/or other means may be resorted to, all within the purview of my invention.

I have shown the refining zone 9 of the tank separated from the tempering zone 10 by a bridge wall 27 which may be of usual form.

Means are provided in the melting and refining zones, respectively, for controlling the pressures existing within these zones. For this purpose, ports 38 and 39 are provided in the side walls of the melting and refining zones, respectively, these ports entering just above the normal glass level. Through either or both of these ports may be inserted suitable pressure responsive instruments suitably connected to the draft controlling means of the firing systems 14 and/or 24—25, respectively. By this arrangement, the pressures in the melting and refining zones may be controlled as desired, either to maintain similar pressures in the two chambers or to provide differential pressures in these chambers.

In the furnace hereinabove described, one may use means for automatically controlling the feed of batch in response to variations in the level of glass and/or the separate automatic regulation of the heating means in each of the chambers in response to temperature conditions in the zones or in the glass. Such automatic means are more fully described in my copending application Serial No. 645,347, and hence will not be described in detail herein.

Figure 7:
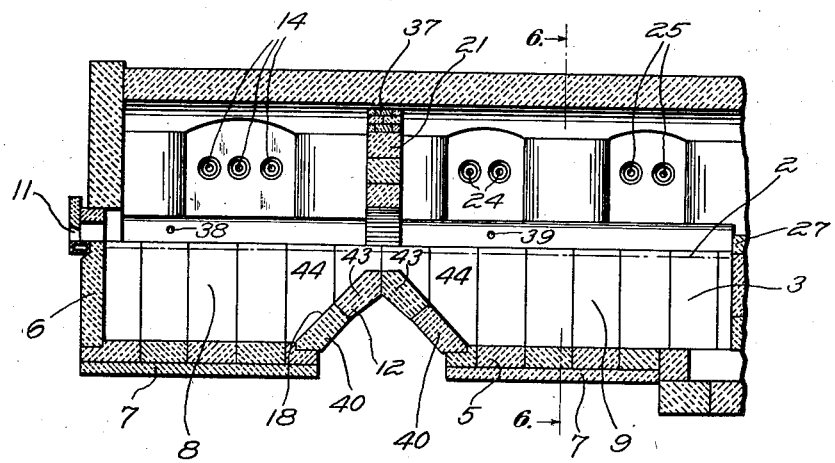
Fig. 7 is a view in vertical section on the line 7—7 of Fig. 6 and with the glass omitted showing the arrangement of blocks and the joints therebetween in the side walls of the tank in the melting and refining chambers.

In Figs. 4, 5 and 7, I have illustrated the details of construction which I prefer to incorporate in the weir 12, though my invention is in no wise limited to these particular features of construction. I prefer to form the weir and the adjacent side walls of the tank in such a manner as to eliminate horizontal joints between the refractory blocks forming the weir and the side walls, particularly in those portions of the tank adjacent to and below the normal glass level. This construction is illustrated in Fig. 7, in which the blocks forming the side walls of the tank in the melting and refining zones are shown as extending up to a point just above the normal glass level which is indicated by the dot and dash line designated 2 in that figure. There are thus no horizontal joints in the blocks forming the side walls which are in contact with the glass.

As shown in Fig. 4, the lower course of the weir proper is formed by blocks 40 and makes a vertical joint 41 with the bottom blocks and are so shaped as to provide an upwardly sloping side 42. Above the blocks 40 and adjacent the two side walls, I provide blocks 43 formed as shown in Fig. 5 to provide the upper course of the weir and also a portion of the side wall as an integral structure. The side walls are completed at the weir by the blocks 44 which are of such form and size as to extend from the bottom of the tank along the upwardly sloping sides of the weir to a point above the glass line.

By the use of means particularly illustrated in the accompanying drawings and described herein, I am enabled to effect a separation of the different functions of the tank to the end that melting is completed under the best conditions and refining of the glass is completed prior to the passage of the glass beneath the bridge wall 27. The transference of glass from one circulation to the other is preferably maintained, and may, by the construction herein illustrated, be maintained such that the transference is substantial only in one direction, that is, in the direction of flow of the glass from the end to which the raw material is supplied toward the end from which the finished glass is withdrawn and is substantially at the rate of glass withdrawal from the tank. In this way, I am enabled to obtain a superior grade of glass, considered from the point of view of the commercial manufacturer, and to melt glass at a relatively high rate in tank of relatively small dimensions.

I have successfully demonstrated my invention by the building and operation of a furnace of commercial size. This furnace had the following characteristics:

Length from rear wall to bridge wall—19½′
Width—10′
Normal glass depth—34″
Fire wall arch located 7¾′ from rear wall
Fire wall arch above glass surface—1′ 11″ at center and 11″ at sides
Weir—26″ high
Center line of weir forward of rear wall—8′ 9″
The weir was substantially of the construction shown in Fig. 4
Center line of rear burners from forward of rear wall—3′
Center line of center burners from forward of fire wall—3½′
Center line forward burners from fire wall—9′ 3″
195 sq. ft. under fire
Rating on old commercial basis—20 tons per day.

This furnace has been operated continuously to produce clear homogeneous flint glass at rates of pull from zero to 40 tons per day and has been found to be quickly responsive to changes in control necessitated by the changes in pull. I have found that the melting and refining circulations may be readily maintained distinct one from the other and that the place of separation of the circulations may be maintained approximately constant for all rates of pull of the tank.

My arrangement makes possible the maintenance of the spaces in the tank devoted separately to the distinct operations of melting and of clearing or refining of substantially constant magnitude, irrespective of wide changes in the rate of pull upon the tank. Thus, when it is desired to increase the pull on the tank, it has been possible to increase the heat input to supply the necessary heat units to the increased supply of cold batch without objectionable shortening of the refining space.

The rate and proportion of the heat input from the two forward firing systems are readily altered for changes in the rate of pull. For example, I have found that when the tank was being operated at zero pull, about 40% of the heat supplied by the two forward systems was supplied by the center system, while when the tank was operating at the highest rate, about 60% of this heat was supplied by the center system. Such changes in the settings of the burners in going from zero pull to 40 tons per day, maintain the zone of highest heat in the glass at approximately the same place in the furnace.

In the operation of the furnace above mentioned, the zone of highest heat in the glass throughout the operations has been maintained over the weir, extending somewhat beyond the fire wall. The point of separation of the circuits in the furnace as built and operated appears to remain approximately constant at a point between one and three feet in advance of the front surface of the fire wall. While undoubtedly there are minor circulations other than those principally described, induced by the colder sloping sides of the weir, these circulations do not appear to interfere with the separation of the melting and refining circulations and may even aid in this separation. The rearward surface current passing over the top of the weir is believed to be primarily a surface current of no great depth and serves the useful purpose in resisting the forward passage of unmelted batch or scum into the refining circulation.

The structural arrangement, including the weir and fire wall together with the separate firing systems, makes possible a definite and steady control of the thermal conditions, such as is not possible in the commercial tanks with which I am familiar.

It will be understood that whenever "glass" is mentioned in the present specification and in the appended claims, this term should be construed in a broad sense to include all analogous materials, such for example as water glass and vitreous enamels, and that this term is not to be construed in any limited sense. I contemplate that my method and/or apparatus may be employed wherever their use is advantageous in the making of any material, such as glass or any analogous product.

I am aware that various changes may be made both in my method as herein set forth and in the apparatus which I have illustrated and described, and I do not wish to be limited, therefore, in any respect other than by the appended claims, which are to be construed as broadly as the state of the prior art permits.

This application discloses matter disclosed in my application Serial No. 405,975, filed November 9, 1929 (now Patent No. 1,941,410) and/or Serial No. 645,347, filed December 2, 1932. As to such matter, this application is a continuation in part of such earlier applications.

What is claimed is:

1. A continuous tank furnace for melting glass, comprising a melting compartment, a refining compartment, a dam type weir extending upwardly from the bottom and from side to side of the tank and partially separating said compartments below the normal level of the surface of the glass therein while permitting free surface flow of glass between said compartments, said weir having a top surface area of such small dimensions that the major portion of the refining of the glass takes place in the refining compartment and after the glass has passed across the weir, means for supplying glass-making materials to the end of said melting compartment distant from said weir, and separately controllable means, located on opposite sides of the weir, for supplying heat to the melting compartment to melt glass-making materials supplied thereto and to the refining compartment to refine the glass therein after it has passed into this compartment across said weir.

2. A continuous tank furnace for melting glass, comprising a melting compartment, a refining compartment and a dam type weir extending upwardly from the bottom and from side to side of the tank and partially separating said compartments below the normal level of the surface of the glass therein while permitting free surface flow of glass between said compartments, said weir having a top surface area of such small dimension that the major portion of the refining of the glass takes place in the refining compartment and after the glass has passed across the weir, means for supplying glass-making materials to the end of said melting compartment distant from the said weir, separately controllable means located on one side of the weir for supplying heat to the melting compartment to melt glass-making materials supplied thereto, and a plurality of separately controllable means all located on the opposite side of the weir for supplying heat to the refining compartment to refine the glass therein after it has passed into this compartment across said weir.

3. A continuous tank furnace for making glass, comprising a container adapted to contain a bath of molten glass up to a predetermined normal level, means for supplying glass making materials to said container adjacent to one end thereof, a weir disposed in said container in a position spaced from said end and extending transversely from side to side of said container at a predetermined distance below said normal level of the glass of said bath across the entire width of said container, so as to aid in the separation of the circulatory currents in the glass, said weir having a sloping glass-contacting surface on that side toward the end of said container to which glass making materials are supplied, a transverse wall above the normal level of the glass in said container and positioned adjacent to said weir for effecting a substantial separation of the flame areas over the portions of the glass bath on opposite sides of said weir, and means for supplying heat of combustion to said tank on both sides of said wall whereby distinct and controllable circulations may be maintained in the glass bath for melting and refining respectively.

4. A continuous tank furnace for making glass, comprising a container adapted to contain a bath of molten glass up to a predetermined normal level, means for supplying glass making materials to said container adjacent to one end thereof, a bridge wall substantially separating said container into a melting and a refining chamber on one side and a tempering chamber on the other side of said bridge wall, a dam type weir disposed in the melting and refining chamber of said container and extending upwardly from the bottom and transversely thereof at a position less than half the distance from the end of the container to which the glass making materials are supplied to the said bridge wall and dividing the melting and refining chamber of said container into a melting portion and a refining portion respectively on opposite sides of the weir, said weir terminating at a level spaced below the normal level of the glass across the width of the container, a transversely extending shadow wall wholly above the normal level of the molten glass in the tank and substantially in alignment with said weir for effecting a substantial separation of the flame spaces on opposite sides of the weir, a plurality of heating means for supplying heat to the melting and refining portions of the tank by combustion and to set up predetermined desired circulatory currents in the several portions of the tank respectively, said heating means being independently controllable to control the circulations for melting and refining respectively in portions in the glass bath lying on opposite sides of the weir.

5. A tank furnace for making glass, comprising a melting portion having side walls of low heat conductivity, a refining portion having side walls of high heat conductivity, and separately controllable heating means for firing said portions.

6. A tank furnace for making glass, comprising a melting portion, a refining portion, a weir partially separating said portions, and means for supplying heat to the portions respectively, the side walls of the refining portion having high heat conductivity as compared to the conductivity of the bottom thereof to aid in the maintenance of active convection currents laterally of the tank in the refining portion.

7. A tank furnace for making glass, comprising a melting portion having side walls of low heat conductivity, a refining portion having side walls of high heat conductivity, a weir separating said portions, and means for supplying heat to said portions, whereby convection circulation in the melting portion laterally of the tank is minimized while such circulation in the refining portion is accentuated.

8. A tank furnace for making glass, comprising a melting portion, a refining portion, a weir partially separating said portions, means for at least partially separating the firing spaces in said portions, and separately controllable means for firing each portion, the side walls of the refining portion being so constructed and arranged as to accentuate the convection currents laterally of the tank.

9. The method of making glass in a continuous tank furnace, which comprises establishing a bath of glass of a general depth such that when heat is applied to the upper surface of the glass, substantial temperature differences exist between the upper and lower strata thereof, substantially separating adjacent portions of the bath below the surface thereof to form two pools adapted respectively for melting and refining which are connected by a restricted passage adjacent to the upper surface of the glass, supplying glass making materials to the surface of the glass at the rear end of the melting pool, applying heat of combustion to the upper surface of said melting pool, regulating such application of heat to create a hot zone extending substantially transversely of the melting pool adjacent to its forward end, and thus creating a convection circulation of a width substantially coextensive with the width of the pool and moving on the surface of the glass rearwardly and toward the point of batch supply, applying heat of combustion to the surface of the glass in the refining pool, controlling the application of such heat independently of the application of heat in the melting pool to create a hot zone entirely within the refining pool and thereby creating circulatory currents within the refining pool distinct and separate from the circulatory currents in the melting pool.

10. The method of making glass in a continuous tank furnace, which comprises establishing a bath of glass of a general depth such that when heat is applied to the upper surface of the glass, substantial temperature differences exist between the upper and lower strata thereof, substantially separating adjacent portions of the bath below the surface thereof to form two pools adapted respectively for melting and refining which are connected by a restricted passage adjacent to the upper surface of the glass, supplying glass making materials or batch to the surface of the glass at the rear end of the melting pool across substantially the entire width thereof, applying heat of combustion to the upper surface of said melting pool, regulating such application of heat to create a hot zone extending substantially transversely of the melting pool adjacent to its forward end, and thus creating a convection circulation of a width substantially coextensive with the width of the pool and moving on the surface of the glass rearwardly and toward the point of batch supply, applying heat of combustion to the refining pool, controlling such application independently of the control of the application of heat to the melting pool to create a hot zone extending longitudinally of the refining pool distant from the sides thereof to create convection circulations moving from the center toward the side walls of the refining pool, and withdrawing glass as made from the end of the furnace opposite the batch supplying end thereof, said circulations when modified by the drag occasioned by the removal of glass as aforesaid creating two parallel substantially helical currents in the glass in which the glass moves constantly forward.

11. The method of making glass in a continuous tank furnace, which comprises establishing a bath of glass of a general depth such that when heat is applied to the upper surface of the glass, substantial temperature differences exist between the upper and lower strata thereof, substantially separating adjacent portions of the bath below the surface thereof to form two pools adapted respectively for melting and refining and which pools are connected only adjacent to the upper surface of the glass, supplying glass making materials to the rear portion of the melting pool, withdrawing glass from the refining pool to be tempered for use and supplying heat to the tank by combustion so as to establish a hot zone in the melting pool transversely of the pool and spaced from the rear end thereof and to set up circulation of glass in this pool influenced by such hot zone, and also to establish a hot zone in the refining pool spaced from but substantially parallel to the side walls, and thus creating independent substantially helical circulations in the refining pool distinct from the circulation in the melting pool.

12. The method of making glass at varying rates of pull in a continuous tank including melting and refining chambers separated below the normal level of the glass by a dam type weir extending upwardly from the bottom and from side to side thereof, which comprises the steps of supplying glass making materials to the end of the melting chamber distant from the weir at rates substantially proportional to the pull on the tank, applying heat from one source to the bath of glass and glass making materials in the melting chamber to accomplish melting of the glass making materials in the melting chamber and to circulate the glass in this chamber in a predetermined path until melting is completed, moving the melted glass across the weir into the refining chamber, applying heat from a second source to refine the glass in the refining chamber while moving it through a path in such chamber distinct from the first named path, the line of demarkation between said paths being adjacent to the top of said weir, and controlling the application of heat to the refining chamber to maintain a zone of high temperature in that chamber and hence to maintain the line of demarkation between the two named circulations at a substantially constant position for varying rates of pull upon the tank.

13. The method of making glass in a continuous tank provided with a melting zone, a refining and homogenizing zone and a tempering zone and in which the melting zone and the refining zone are partially separated below the normal glass level by a dam type weir extending upwardly from the bottom and from side to side of the tank and provided with separately controllable heating means respectively for the melting and refining zones which comprises, supplying glass-making materials to the rear end of the melting zone at rates substantially proportional to the varying rates of pull on the tank, applying heat to the glass in the melting zone from a controllable source of heat supply to create in the melting zone differential temperatures between the forward and rearward portions to cause convection circulation in the melting zone such that the glass making materials are maintained rearwardly of the zone and the glass is completely melted before it passes out of the melting zone and into the refining zone, passing glass into the refining zone at rates varying with the rate of pull upon the tank, applying heat from a separately controllable source to the glass in the refining zone to create in that zone differential temperatures between the central longitudinal portion and the side portions to create convection circulation of the glass in that zone beginning at a point forward of the weir and having such components of movement forwardly and transversely of the tank as substantially to prevent return of glass once entering into the refining circulation to the circulation within the melting zone, and controlling the application of heat in the refining zone to maintain the point of beginning of the refining circulation substantially constant for varying rates of pull upon the tank.

14. A glass making furnace formed of refractory blocks and adapted to contain glass at a normal level comprising, a melting zone and a refining zone, and a weir separating said zones and rising from the bottom thereof to a point below the normal level of the glass and extending completely across the furnace, the upper portions of said weir adjacent the side walls of the furnace being formed of refractory blocks so shaped as to form also a portion of the side wall of the furnace.

15. The method of making glass in a tank having a dam type weir extending upwardly from the bottom and transversely from side to side of the tank which comprises, melting glass-making materials in a melting chamber on one side of the weir while maintaining a zone of highest temperature in the melting glass in a transversely extending zone adjacent to the weir, and refining the melted glass in a refining chamber on the side of the weir opposite from the melting chamber, while maintaining in the glass in the refining chamber a zone of high temperature longitudinally of the tank and spaced from the relatively cool side walls thereof, said two zones of high temperature meeting one another adjacent to the weir.

16. The method of continuously making glass in a continuous tank, which comprises the steps of maintaining a bath of molten glass in the tank, charging glass-making materials to one end of said bath at rates substantially proportional to the rate finished glass is being withdrawn from the tank, applying heat from one source to the bath of glass and glass-making materials adjacent to the charging end to melt the glass-making materials and to maintain an orbital circulation in the bath adjacent to the charging end such that the upper portion of the bath at this end moves toward the glass-making materials, diverting a portion of completely melted glass from this orbit adjacent to the upper portion of the bath, moving this diverted portion forwardly and away from the said orbit and gradually toward the opposite or supply end of the bath, subjecting this glass to heat from a second source and regulating its temperature to circulate it transversely of the bath and to refine it as it approaches the supply end of the bath, moving the refined glass at the supply end of the bath into a tempering or work-out chamber from which it may be withdrawn for fabrication, and coordinating the forward movement of the glass occasioned by the removal of finished glass from the tank and the distribution and amount of the heat supply to maintain the circulating movement of the refining glass distinct from the first-mentioned orbital path, and thus to prevent contamination of the refining glass.

17. The method of making glass in a continuous tank, which comprises establishing a pool of molten glass divided below its surface into a melting zone and a refining zone, supplying glass-making materials to the end of the melting zone distant from the refining zone, applying flame from one heating source to the glass in the melting zone to fuse the glass-making materials supplied thereto and to create an orbital convection circulation moving on the surface of the glass in the melting zone toward the end thereof at which the glass-making materials are fed, passing fused glass out of said circulation over the division into the refining zone, applying flame to the refining zone from a separate heating source to create convection circulation in the refining zone distinct from the circulation in the melting zone, and regulating the application of heat from said heating sources and the rate of supply of glass-making materials to produce glass of good commercial quality at a rate at least as high as one ton of glass per twenty-four hours for every six square feet of glass surface in the melting and refining zones.

VERGIL MULHOLLAND.